US012497308B2

(12) United States Patent
Hinkle et al.

(10) Patent No.: US 12,497,308 B2
(45) Date of Patent: Dec. 16, 2025

(54) BRINE GENERATION SYSTEM WITH FREEZE PROTECTION

(71) Applicant: The Cope Company Salt, Lancaster, PA (US)

(72) Inventors: Brandon Hinkle, Lancaster, PA (US); Marc Hertzler, Lancaster, PA (US); John Connell, Lancaster, PA (US)

(73) Assignee: The Cope Company Salt, Lancaster, PA (US)

( * ) Notice: Subject to any disclaimer, the term of this patent is extended or adjusted under 35 U.S.C. 154(b) by 380 days.

(21) Appl. No.: 18/323,174

(22) Filed: May 24, 2023

(65) Prior Publication Data

US 2024/0391807 A1 Nov. 28, 2024

(51) Int. Cl.
*C02F 1/68* (2023.01)
*B65D 88/74* (2006.01)
*B65D 90/51* (2019.01)

(52) U.S. Cl.
CPC .............. *C02F 1/68* (2013.01); *B65D 88/744* (2013.01); *B65D 88/748* (2013.01); *B65D 90/51* (2019.02); *C02F 2209/02* (2013.01)

(58) Field of Classification Search
CPC .. C02F 1/0008; C02F 1/42; C02F 1/68; C02F 2209/02; C02F 2209/42; G05D 9/12; B01D 17/12; B01D 24/46; B01J 49/75; B01J 49/80; B01J 49/85; B65D 8/74; B65D 8/744; B65D 8/748; B65D 90/51; B65D 90/511; B65D 88/74; B65D 88/744; B65D 88/748
USPC ................ 210/86, 121, 190; 220/592.01, 28
See application file for complete search history.

(56) References Cited

U.S. PATENT DOCUMENTS

| | | | | |
|---|---|---|---|---|
| 1,976,906 | A * | 10/1934 | Waldron | C02F 1/42 210/278 |
| 3,899,421 | A * | 8/1975 | Keilin | B01J 49/00 210/104 |
| 4,987,409 | A * | 1/1991 | Jackson | G01F 23/0015 340/623 |
| 7,803,335 | B1 * | 9/2010 | Cope | C02F 1/42 422/279 |
| 11,466,870 | B1 * | 10/2022 | Shahsavar | C02F 1/441 |

(Continued)

FOREIGN PATENT DOCUMENTS

| CN | 102003575 B | * | 5/2013 | ............ B29C 48/92 |
|---|---|---|---|---|
| GB | 405988 A | * | 2/1934 | ................ C02F 1/42 |

OTHER PUBLICATIONS

English translation of CN_102002575_B, May 22, 2013. (Year: 2013).*

*Primary Examiner* — Joseph W Drodge
(74) *Attorney, Agent, or Firm* — Saxton & Stump, LLC (57) ABSTRACT

A brine generation system having a tank for containing crystalline salt, a level control system regulating a water supply to the tank which maintains a desired fluid level within the tank, and a freeze protection system with a duct peripherally disposed on an interior tank sidewall, the duct defining an interior space into which is placed a thermostatically controlled heating element. A portion of the duct extends to the outside of the tank enabling access to the interior space such that the heating element may be replaced without disturbing any external tank insulation or emptying the tank contents.

15 Claims, 8 Drawing Sheets

(56) References Cited

U.S. PATENT DOCUMENTS

| | | | |
|---|---|---|---|
| 2005/0000902 A1* | 1/2005 | Newenhizen | B01D 3/346 210/96.1 |
| 2007/0207053 A1* | 9/2007 | Doyle | C02F 1/008 422/14 |
| 2008/0267824 A1* | 10/2008 | Rambicourt | G01N 33/18 422/73 |
| 2016/0200596 A1* | 7/2016 | Peddicord | C02F 1/008 29/428 |
| 2017/0217797 A1* | 8/2017 | Cope | C02F 1/42 |
| 2017/0275409 A1* | 9/2017 | Tsou | C08F 297/083 |
| 2018/0306463 A1* | 10/2018 | Yuan | F24H 1/44 |
| 2020/0103144 A1* | 4/2020 | Knoblett | F24H 1/186 |

* cited by examiner

BRINE GENERATION SYSTEM WITH FREEZE PROTECTION

FIELD OF THE INVENTION

The present disclosure is generally directed to apparatus for making brine and, more particularly, to an internal freeze protection system for a brine generation system.

BACKGROUND OF THE INVENTION

Brine solutions are used in numerous commercial and industrial processes, including water conditioning processes. Large-scale brine production typically involves a brine generation system comprising a salt dissolver tank, means to supply crystalline salt to the tank, and means to deliver water to the tank. Water is introduced into the tank to dissolve a portion of the salt therein to create a brine solution. The salt dissolver tank may be provided with automatic salt and/or water feed controls to allow unattended brine generation that may then be integrated into a water conditioning system or other processes.

Salt supplies may be replenished on periodic batch intervals established based on brine demand. Water feed required for brine generation is more closely tied to brine demand by the downstream process and is preferably automatically regulated by timers or by flow measurement of the brine supplied by the tank.

Due to their size, it is often convenient to locate these salt dissolver tanks remotely from the water conditioning systems being supplied and provide a smaller brine day tank proximate to the conditioning system. One such brine generation system is disclosed in a "Remote Brine Tank for Commercial Water Softeners," U.S. Pat. No. 7,803,335 to Cope dated Sep. 28, 2010, which discloses a buried brine generation system. It is not always practical or permissible to bury the components of such systems which has created demand for brine generation systems capable of above-ground installation.

Unlike buried installations in which the tank is generally maintained around 55° F., outdoor tanks experience a range of temperature. Although 100% saturated sodium chloride brine does not freeze until temperatures reach 15° F. (−9.4 C) it is important that salt dissolver systems situated outdoors, and above-ground have a method of ensuring consistency of operation in cold weather. Heretofore freeze protection system heating elements have been mounted on the external wall of a salt dissolver tank and the heated portion of the tank wall is then wrapped with insulation. The typical life of a freeze protection element is 3 to 5 years at which time replacement is required. Removal and replacement of tank insulation in order to access externally located heating elements requires days of labor and material.

What is needed is an automated brine generation system suitable for outdoor, above-ground installations with easily maintained freeze protection to assure a reliable brine supply for downstream operations. Additional benefits would be realized by an outdoor salt dissolver tank having an automated, volume-based water feed assures an adequate brine supply is available to meet downstream process demand. Other features and advantages will be made apparent from the present specification. The teachings disclosed extend to those embodiments that fall within the scope of the claims, regardless of whether they accomplish one or more of the aforementioned needs.

SUMMARY OF THE INVENTION

In one embodiment of the present invention, a brine generation system is provided comprising a tank containing crystalline salt, a level control system configured to regulate a water supply to the tank to maintain a desired fluid level within the tank, and a freeze protection system comprising a duct partially disposed within the tank and a heating element disposed within an interior space of the duct, a portion of the duct extending outside of the tank and enabling access to the interior space. Access to the duct interior space from outside of the tank permits the heating element to be easily replaced from outside the tank without disturbing any external insulation that may be installed on the tank or emptying the tank's contents.

In another embodiment, a brine generation system tank is provided having a tank, a level control system configured to regulate a water supply to the tank to maintain a desired fluid level within the tank, and a freeze protection system comprising a duct, a portion of which is horizontally arranged and extends substantially about an interior periphery of the tank, and a heating element disposed within an interior space of the duct. The duct vertically positions the heat source at a level within the anticipated tank fluid level, improving heat transfer to the fluid by eliminating the heat transfer resistance of the tank wall. Externally disposed heat sources require additional insulation to cover the heat source and force heat through the tank wall. Such insulation may not be needed with internally disposed heat sources.

In another embodiment, a brine generation system is provided comprising a tank containing crystalline salt, a level control system configured to regulate a water supply to the tank to maintain a desired fluid level within the tank, and a freeze protection system having an internally disposed duct containing a heating element, the duct including an externally accessible service opening. The level control system includes a float-operated fill valve operably connected to a manifold disposed internal to the tank which disperses fill water uniformly within the tank to better dissolve salt within the tank and improve brine generation.

In another embodiment, a brine generation system tank is provided having a tank, a level control system configured to regulate a water supply to the tank to maintain a desired fluid level within the tank, and a freeze protection system comprising a duct, a portion of which is horizontally arranged and extends substantially about an interior periphery of the tank, and a heating element disposed within an interior space of the duct. The level control system setpoint assures a fluid level within the tank that is at least above the vertical location of the duct and heating element so that the heat source is position within the brine solution contained in the tank for improved heat transfer, especially when compared to conventional freeze protection systems employing heat trace tape mounted on external tank surfaces.

In another embodiment, a method of providing freeze protection for a brine generation system includes providing a duct disposed on an interior sidewall of the tank and substantially extending peripherally therearound, the duct being sealed to prevent contact with contents of the tank and accessible from outside of the tank through a connection port. A replaceable heating element is directed through the connection port and into an interior space enclosed by the duct so that it extends substantially through the interior space. The heating element is operably connected to a thermostatically controlled power source to maintain the temperature of the fluid (brine) within the tank above its freezing point.

In another embodiment of the present invention an above-ground brine generation system having automatic level control and freeze protection that is durable in construction, inexpensive of manufacture, carefree of maintenance, easily assembled, and simple and effective to use is provided.

These and other advantages are provided by a brine generation system having an above-ground tank for containing crystalline salt, a level control system regulating a water supply to the tank which maintains a desired fluid level within the tank, and a freeze protection system with a duct peripherally disposed on an interior tank sidewall, the duct defining an interior space into which is placed a thermostatically controlled heating element. A portion of the duct extends to the outside of the tank enabling access to the interior space such that the heating element may be replaced without emptying the tank contents or disturbing any external tank insulation that may be in place.

Other features and advantages of the present invention will be apparent from the following more detailed description of the preferred embodiment, taken in conjunction with the accompanying drawings which illustrate, by way of example, the principles of the invention.

BRIEF DESCRIPTION OF DRAWINGS

The advantages of this invention will be apparent upon consideration of the following detailed disclosure of the invention, especially when taken in conjunction with the accompanying drawings wherein.

Wherever possible, the same reference numbers will be used throughout the drawings to represent the same parts.

DETAILED DESCRIPTION OF THE INVENTION

Operational concepts of a remote brine generation system for supplying commercial water softeners are discussed in "Remote Brine Tank for Commercial Water Softeners," U.S. Pat. No. 7,803,335 to Cope dated Sep. 28, 2010, the descriptive portions of which are incorporated by reference herein.

In FIGS. 1 through 9, there is shown a portion of a brine generation system 10 incorporating the principles of the instant invention and being operable to supply brine to a commercial water softening system. The brine generation system 10 includes a salt dissolving tank 20 configured to receive salt in crystalline from a salt delivery system 40 and water from a water supply system 60. Crystalline salt is dissolved in the water to create brine which is delivered from the tank by a brine supply system 50 to a downstream process, such as a commercial water softening system or other ionic exchange systems. The brine generation system may be connected directly to the commercial water softener system, or the generated brine supply may be transported by other means in batches from the remotely located brine generation system to a local storage tank for use by the process.

Components of the brine generation system 10 are preferably constructed from materials selected to minimize corrosion by the salt and brine contents. Thermoplastic, fiberglass, and stainless steel are preferred. In the illustrated embodiment, the salt dissolving tank 20 is constructed of polyethylene material while wetted piping components are made of polyvinyl chloride (PVC).

Figure 2:
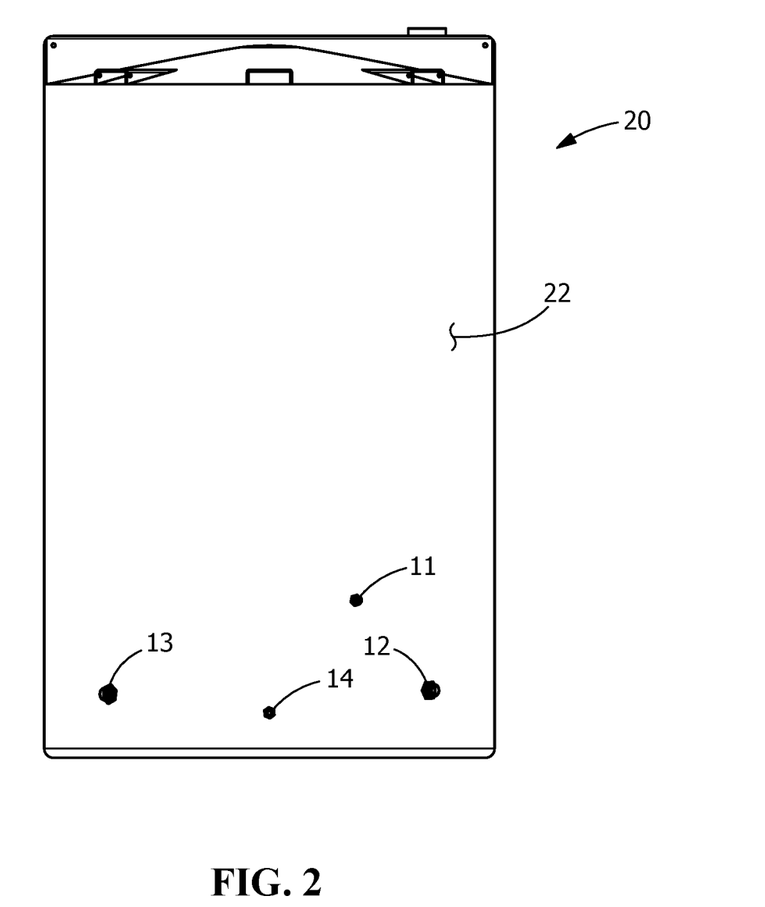
FIG. 2 is an elevation view of a salt dissolving tank used in a brine generation system illustration relative location of tank connections.

Salt dissolving tank 20 is configured to allow installation above-ground and outdoors. Tank 20 includes a plurality of connections for interface with related systems. A salt inlet connection 15 and a vent connection 16 are provided on the top of the tank for interface with a salt delivery system 40. Bulkhead connections are provided in the tank sidewall 22 for connection with other related systems including water supply connection 11 for a water supply system 60, brine supply connection 12 for a brine supply system 50, level control connection 13 for a liquid level control system 70, and freeze protection connection 14 for a freeze protection system 80.

The illustrated embodiment of tank 20 is nominally 10 feet (3 m) in diameter and approximately 16 feet (4.9 m) in height. A nominal fluid level of approximately 42 inches (107 cm) yields approximately 800 gallons (3028 L) of brine available for use by the downstream process. The tank may be filled with crystalline salt to a level near the top of the tank to allow brine generation for an extended period before replenishment of the salt supply is necessary.

The salt dissolving tank 20 and other externally located components may be covered with thermal insulation for operation in extremely cold environments as is well known. The translucence of polyethylene tanks allows visual observation of the salt level therein if the tanks remain uninsulated. Polyethylene has a thermal conductivity of 0.5 W/mK. In the illustrated embodiment, tank 20 has a 2-inch (5 cm) sidewall thickness in the fluid level region which provides a reasonable degree of insulation capability without the need for additional thermal insulation.

Figure 1:
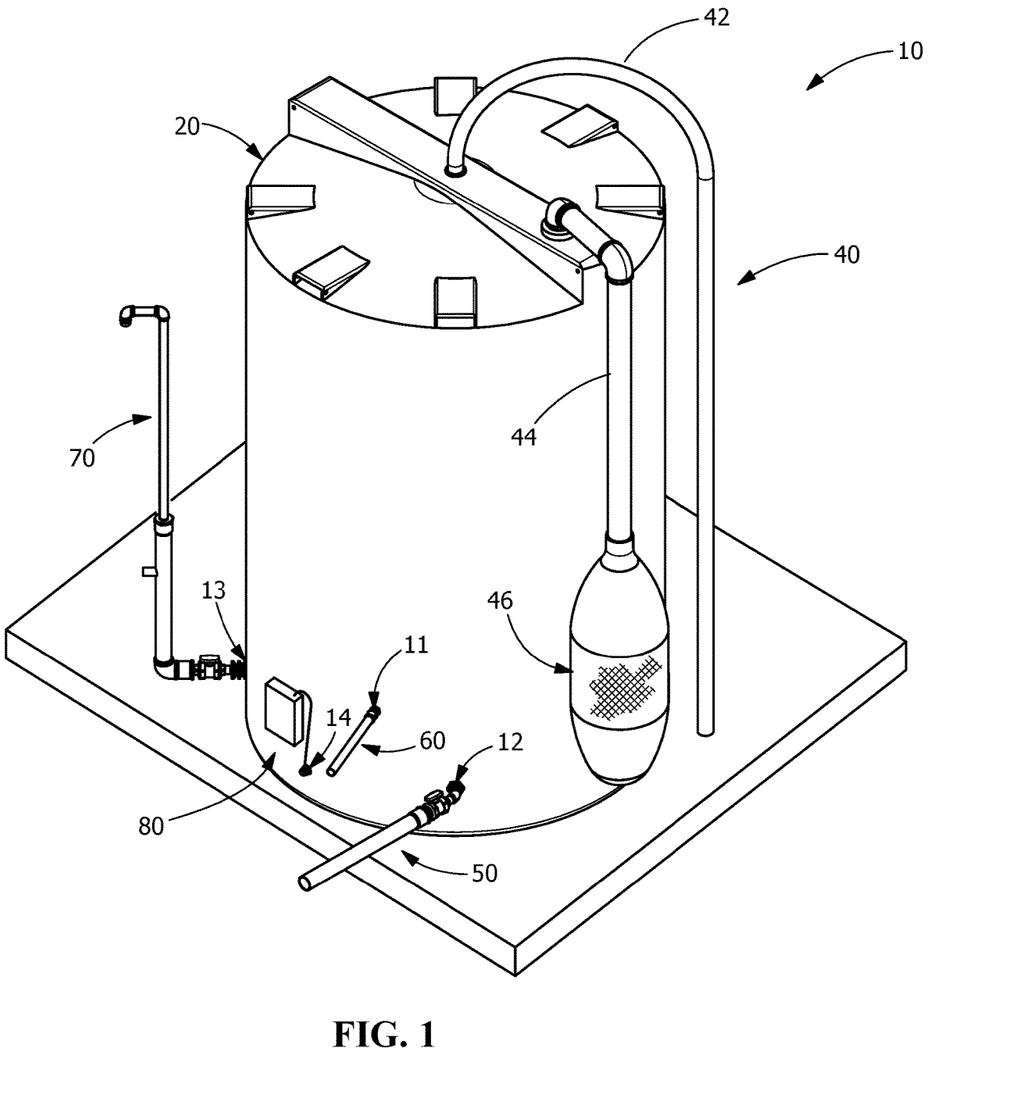
FIG. 1 is a perspective view of a remote brine generation system incorporating the principles of the instant invention to provide a supply of brine to a commercial water softening system located a distance away from the brine generation system.

Salt delivery system 40 includes a salt supply pipe 42 through which crystalline salt may be delivered and a vent 44 which prevents tank 20 pressurization as salt is delivered to the tank. Crystalline salt may be delivered though supply pipe 42 using forced air. Mechanical means may also be used to deliver salt to the tank. Vent 44 discharges to the atmosphere and includes a filter 46 to trap any crystalline salt that may be entrained in the air being exhausted from the tank.

Tank 20 is sized to hold a quantity of crystalline salt to allow brine generation for an extended period before replenishment is required. The illustrated embodiment of tank 20 may be filled to near the top of the tank and may hold upwards of 35 tons (31,751 kg) of salt.

Figure 3:
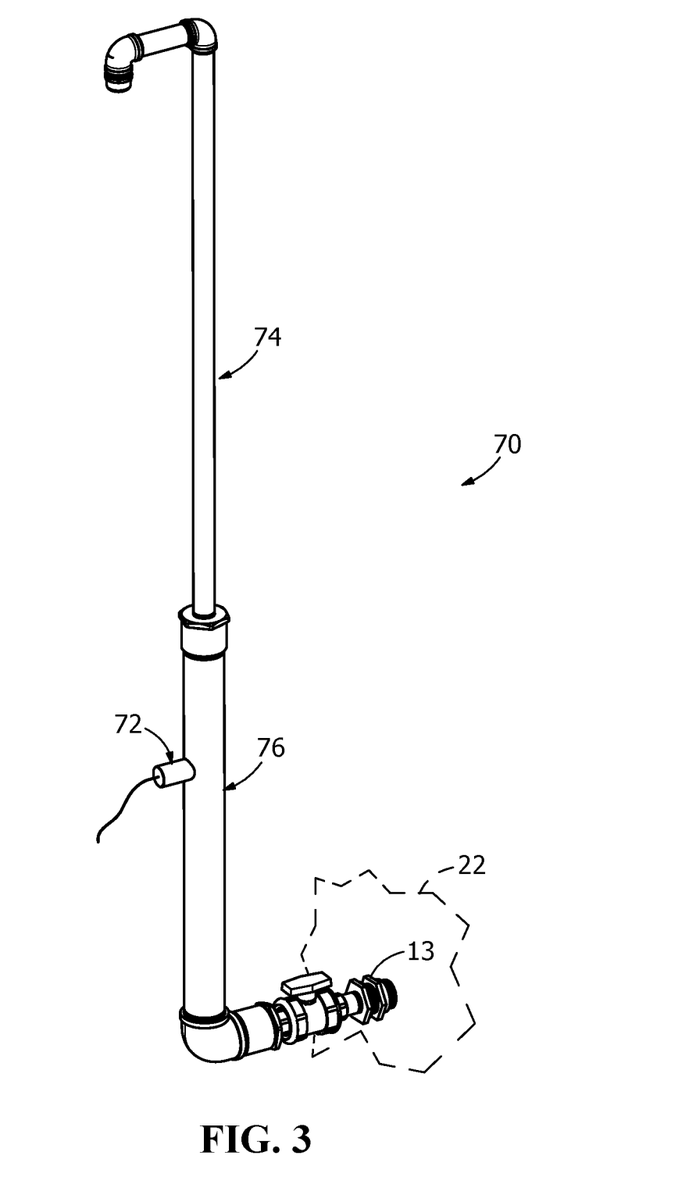
FIG. 3 shows one embodiment of a liquid level control system for a brine generation system.
Figure 4:
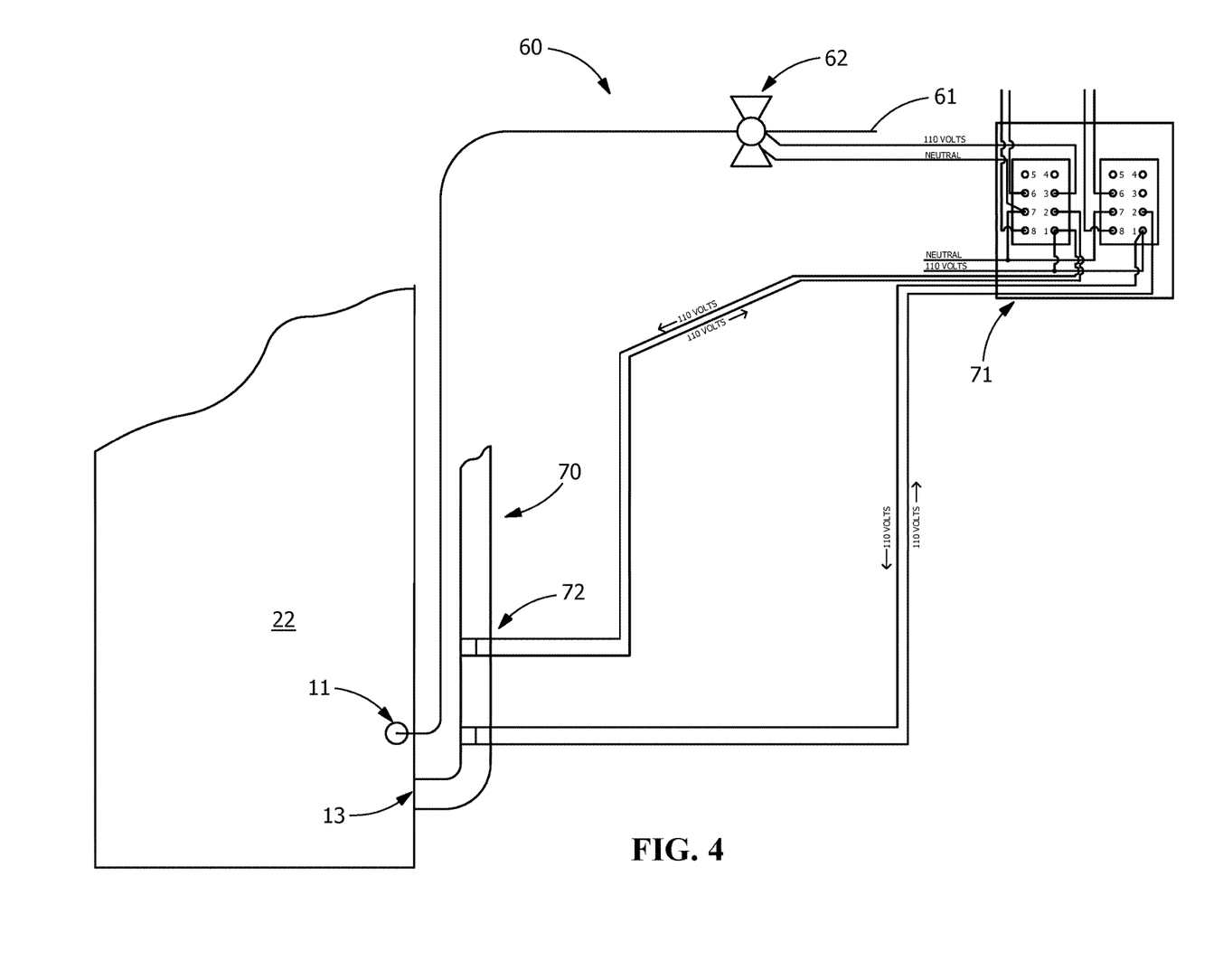
FIG. 4 shows a control arrangement for the liquid level control system of FIG. 3.

Water supply system 60 includes a water source 61 having an inlet valve 62 operably controlled by a liquid level control system 70. A float switch 72 provided in the liquid level control system may be conveniently disposed of in an external standpipe 74 which is hydraulically connected to the tank interior. Standpipe 74 is vented at its uppermost end to allow fluid level to fluctuate therein. The vented opening also provides a vacuum break to prevent tank damage during brine extraction. Float switch 72 is configured to manage the operation, preferably by electric signals, of the water inlet valve 62. As the liquid level rises and falls within tank 20 and correspondingly in standpipe 74, float switch 72 signals a controller 71 to open or close water inlet valve 62 as needed to maintain the desired liquid level within the tank. A portion of standpipe 74 may be constructed of transparent pipe to provide a visual indicator 76 of the liquid level in the tank.

Figure 5:
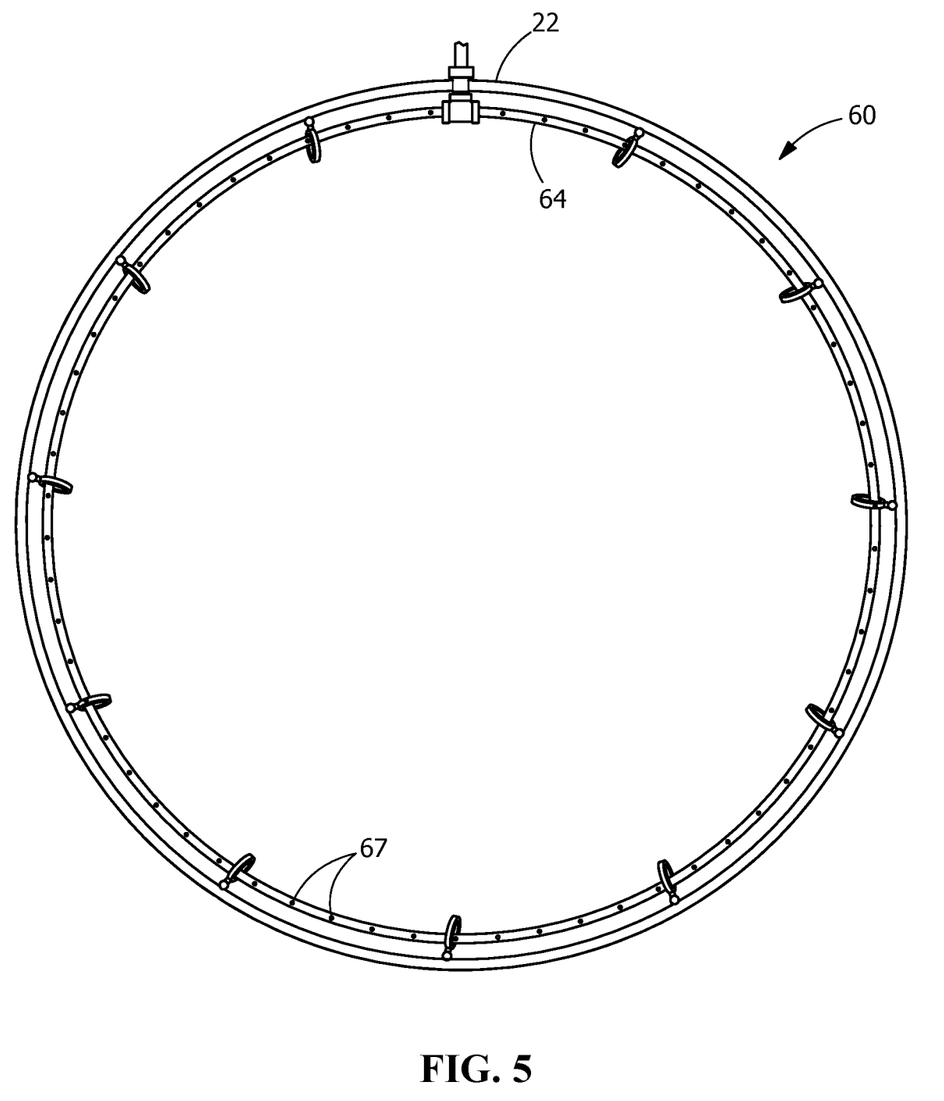
FIG. 5 shows one embodiment of an internal water inlet header for the brine generation system.

Flow from the water inlet valve 62 is delivered to the tank through a water supply connection 11. The water supply may be dispersed within the tank by a water distribution manifold 64 disposed within the tank and connected to the water supply connection 11. The distribution manifold 64 may comprise pipe circumferentially disposed about the interior of the tank. The manifold 64 may be mounted to the interior surface of tank sidewall 22 and secured by clamps or the like. The manifold includes a plurality of holes 67 allowing water supplied to the distribution manifold 64 to be uniformly dispersed into the crystalline salt contained in the tank to promote dissolving of the salt and brine production. The distribution manifold 64 is preferably mounted to the interior sidewall circumference of the tank proximate to or below the upper limit of the fluid level.

Materials for the water supply piping should be selected for corrosion resistance due to the potential contact with salt and/or brine. Piping and wetted components may be fabricated from polyvinyl chloride (PVC) or the like. Mounting hardware may similarly be fabricated from a corrosion-resistant material. The corrosion-resistant material may be stainless steel.

In the illustrated embodiment, a nominal fluid level corresponding to the distribution manifold position is approximately 42 inches (107 cm) above the tank bottom. Using this distribution manifold elevation as the upper fluid level yields approximately 800 gallons (3028 L) of brine available for use by the downstream process.

Portions of the water supply system 60 piping and components located outdoors may be provided with heat tracing, insulation, or a combination thereof to protect system piping and components from freezing.

Figure 6:
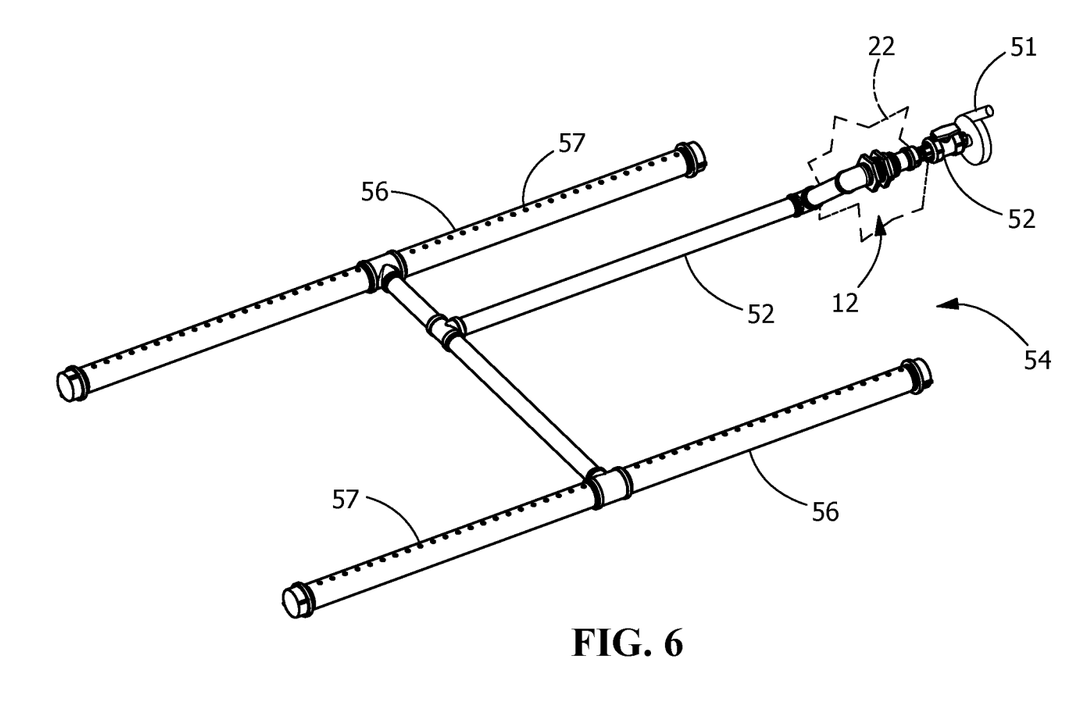
FIG. 6 shows one embodiment of a brine collection system used to deliver brine from the brine generation system.

A brine supply system 50 is provided to deliver brine from the tank to a water softener system or other processes requiring brine. A pump 51 is generally provided and takes suction from a suction pipe 52 connected to a brine manifold 54 located within the tank. The pump is typically external to the tank, with external locations being preferred for improved maintenance considerations. The suction pipe 52 may connect through a tank penetration 12 allowing externally located pumps to take suction from brine manifold 54 and draw brine from the tank. Brine manifold 54 is preferably positioned proximate to the bottom of the tank where a supply of liquid brine is assured and includes one or more perforated collector pipes 56. The collector pipe perforations 57 are sized to prevent the entrainment of undissolved salt crystals into manifold 54 of a size greater than can be passed through the brine pump 51 without damage.

An aggregate filter can be added to the bottom most part of the tank to act as a filter so much finer salt crystals, typically food-grade, may be used for brine generation. The aggregate filter layer may be 12 inches deep.

Materials for brine supply system piping and components should be selected for corrosion resistance. Brine supply system piping and components may be made from polyvinyl chloride (PVC) material.

Portions of brine supply system 50 piping and components located outdoors may be provided with heat tracing, insulation, or a combination thereof to protect system piping and components from freezing.

Figure 7:
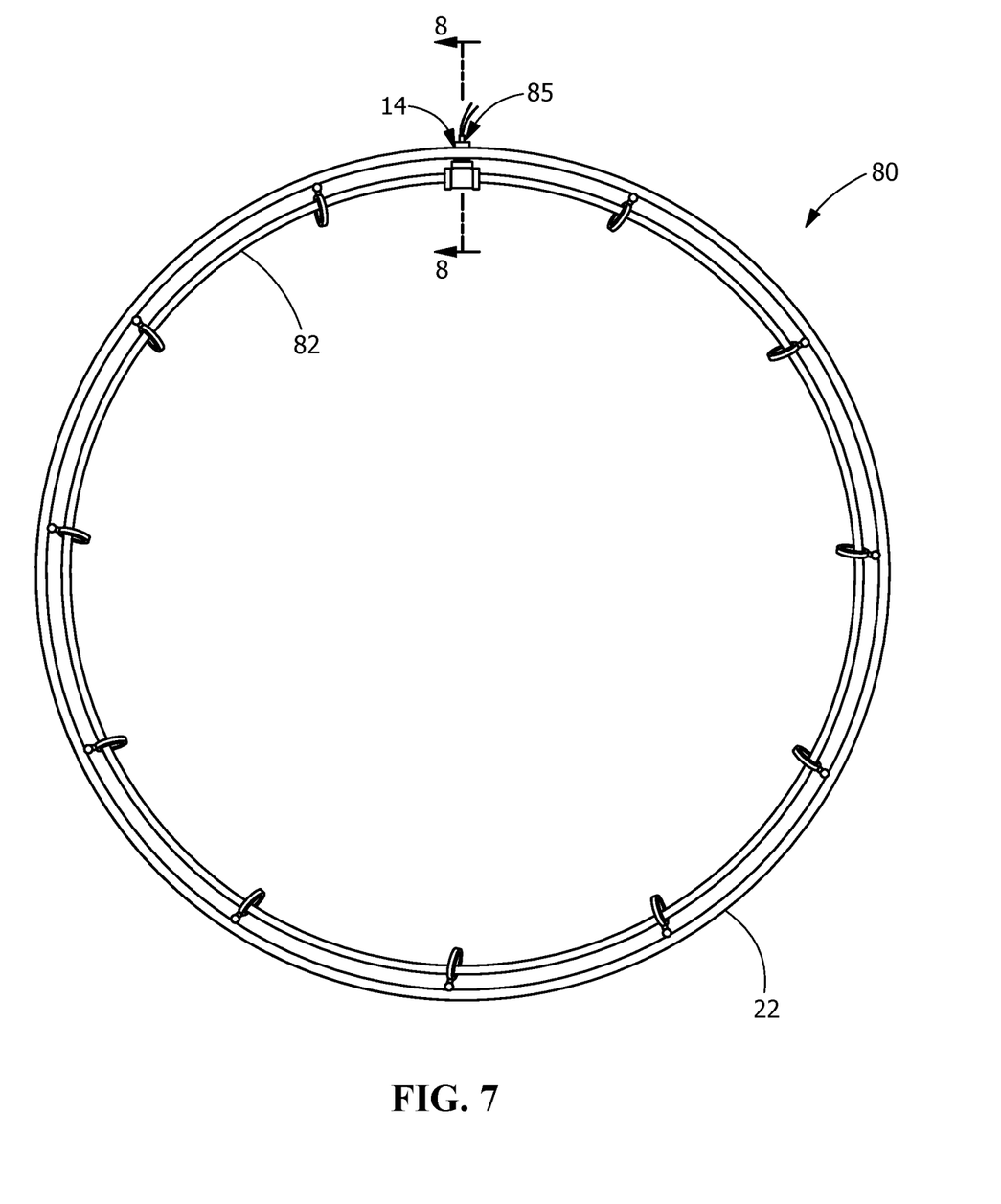
FIG. 7 shows one embodiment of a freeze protection system for a brine generation system.
Figure 8:
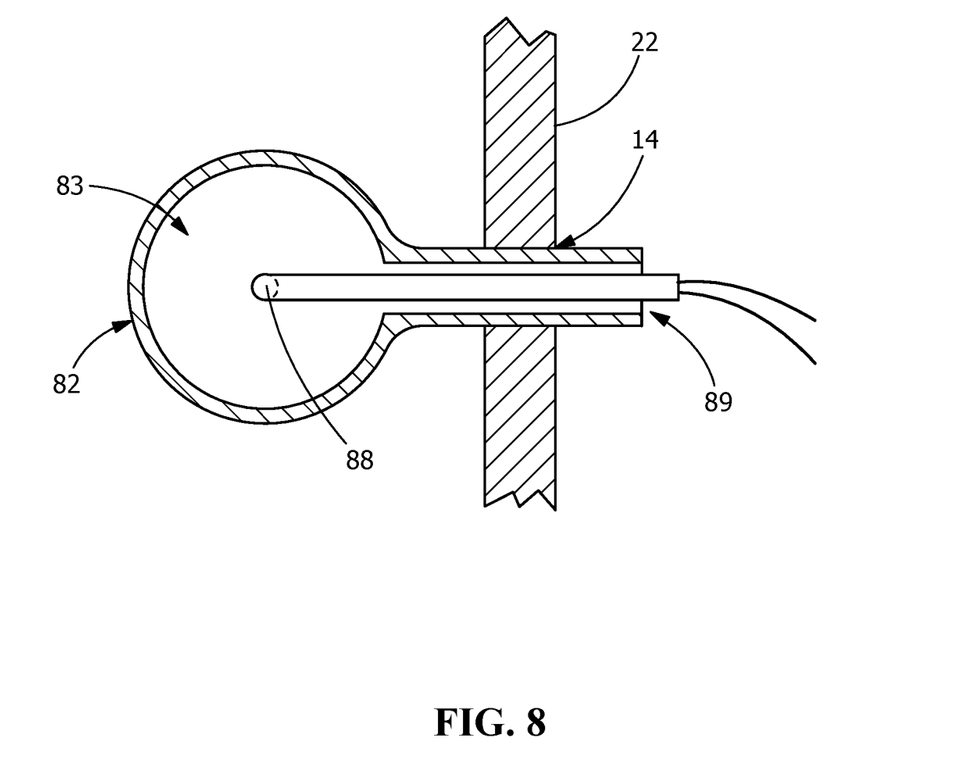
FIG. 8 is a detailed view of a portion of the freeze protection system shown in FIG. 7.

The brine generation system 10 is provided with a freeze protection system 80. Although 100% saturated sodium chloride brine does not freeze until temperatures reach 15° F. (−9.4° C.), outdoor placement in regions where anticipated low temperatures may be less could result in degraded performance. The freeze protection system 80 consists of a sealed duct 82 circumferentially disposed about the tank interior and mounted to the interior sidewall of the tank. Sealed duct 82 encloses an interior space 83. Access to the interior space 83 is through a connection adapter 84 which penetrates the tank sidewall 22 at a bulkhead fitting 14 and allows access to the interior space 83 from outside of the tank via access port 85. Connection adapter 84 extends sufficiently beyond the exterior of the tank sidewall to permit access to the adapter without the need to remove any tank insulation that may be present. The connection adapter and duct are sealed to isolate the interior space so that access thereto may be accomplished without emptying the tank contents.

In the illustrated embodiment, freeze protection system 80 duct 82 may comprise a one-inch flexible pipe mounted on the interior sidewall of salt dissolving tank 20. The one-inch flexible pipe is preferably formed from flexible polyethylene material. The flexible polyethylene material is preferably material meeting specification ASTM D2239/AWWA C901. The connection adapter 84 may comprise a two-inch tee with reducing adapters connected to the ends of the one-inch pipe to seal the duct. A two-inch pipe is connected to the tee and penetrates the tank sidewall through a bulkhead fitting to provide access to the interior space of the duct from outside the tank.

Figure 9:
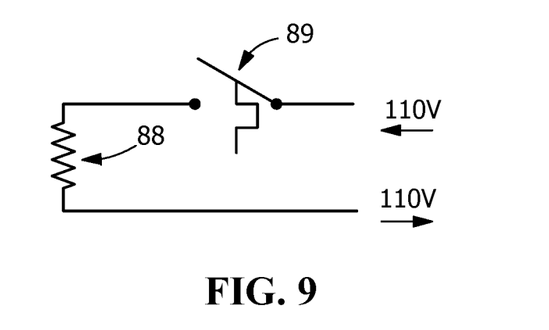
FIG. 9 is one embodiment of a control schematic for the freeze protection system.

A heating element 88 is inserted through the access port and extended through the duct so that it substantially encircles the tank. The preferred heating element may be an electrical heat trace cable. The heat trace cable includes an electrical connection extending through the access port 85. An electrical power source may be connected to the heat trace cable at a junction 87 located at or adjacent to the access port. The electrical power source may be 120V electrical power. This electrical power supply line is preferably operably connected to an ambient temperature-controlled thermostat 89 which may also be located at junction 87. The thermostat may be set to energize at 20° F. (−6.6° C.) and deenergize once ambient temperature reaches 32° F. (0° C.). The electrical power system may be connected to a 120V GFCI breaker.

In one embodiment, heating element 88 comprises an electrical heat trace cable dissipating 5 watts per foot (W/ft) which has been demonstrated effective at preventing freezing within the brine generation tank. In the illustrated embodiment, the heating element will raise the temperature of an assumed 800 gallons of fluid within the tank by 4° F. in approximately 49 hours.

The expected operational life of the electrical heat trace cable ranges from 3 to 5 years. The heating element 88 may be easily replaced by pulling the heat trace cable into or out of the duct through the access port 85 using fish tape or the like. This method of heating element replacement does not require the salt-dissolving tank 20 to be emptied nor does it require the removal of external insulation that may be present on the tank exterior.

Material selection for duct 82 must assure that the duct will not melt or otherwise be compromised by contact with heating element 88. Similar considerations for the material selection of tank 20 provide a margin of safety to prevent unintentional breaches of tank integrity. Polyvinyl chloride (PVC) material traditionally used in brine generation system piping has a maximum temperature limit of 140° F. (60 C). Electrical heat trace cable dissipating 5 W/ft has a maximum surface temperature of 150° F. (66 C). The preferred polyethylene materials used in tank 20 and duct 82 have melting points ranging from 239° F. to 275° F. (115 to 135 C). Contact between heating element 88 and the duct 82 will not damage the integrity of the duct or the tank.

A heat transfer media may be added to the duct to improve heat transfer from the heating element contained there to the fluid (brine) in the tank. The heat transfer media may be a glycol solution. Compatibility between the heating element and the heat transfer media is required. The invention does not preclude the circulation of a heated fluid through duct 82 to serve as an alternative to the use of heating element 88, though the complexity of such systems is unlikely to offer the economic efficiency of the preferred heating element.

Duct 82 is preferably mounted on the interior circumference of the tank sidewall and positioned at a level below the minimum anticipated fluid level. In the illustrated embodiment, duct 82 is vertically located 17 inches (43 cm) above the bottom of the tank while the brine level is maintained at least 18 inches (46 cm) above the tank bottom.

Using the above apparatus enables a method of conveniently providing freeze protection for brine generation tanks located above ground and outdoors. The method includes providing a duct 82 disposed on an interior sidewall of the tank that substantially extends peripherally around the interior sidewall 22. The duct is preferably mounted to the interior sidewall surface and located at or below the lowest expected fluid level within the tank. The duct is sealed to prevent contact with the contents of the tank and accessible only from outside of the tank through an access connection port 85. A replaceable heating element 88 is directed through the access port and into an interior space 83 enclosed by the duct so that it extends through the interior space and thus substantially around the tank interior periphery. The heating element is operably connected to a thermostatically controlled power source to activate the heating element within a specified temperature range and thereby maintain the temperature of the fluid (brine) within the tank above its freezing point.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes, and omissions may be made in the design, operating conditions and arrangement of the exemplary embodiments without departing from the scope of the present application.

The invention claimed is:

1. A freeze-resistant tank comprising:
   a tank containing crystalline salt;
   a level control system configured to regulate a water supply to the tank to maintain a desired water level within the tank; and
   a freeze protection system comprising a duct partially disposed within the tank and a heating element disposed within an interior space of the duct, the duct including a connection port extending outside of the tank and enabling access to the interior space,
   wherein the portion of the duct within the tank is generally horizontally arranged and extends peripherally around an interior side wall of the tank.

2. The brine freeze-resistant tank of claim 1, wherein the portion of the duct within the tank is located so as to be below the desired water level in the tank.

3. The freeze-resistant tank of claim 2, wherein the duct and connection port are configured to enable replacement of said heating element from outside the tank.

4. The freeze-resistant tank of claim 3, wherein the interior space is isolated from water in the tank.

5. The freeze-resistant tank of claim 4, wherein the freeze protection system further comprises a thermostatic control operably coupled to the heating element.

6. The freeze-resistant tank of claim 1, wherein the tank and duct comprise a material having a melting point greater than 150° F.

7. The brine generation system freeze-resistant tank of claim 6, wherein the material is polyethylene.

8. The freeze-resistant tank of claim 1, wherein the level control system comprises a float-operated fill valve operably connected to a sparger disposed internal to the tank.

9. A method for providing freeze protection for a tank comprising the steps of:
   providing a duct internal to the tank, the duct being sealed to prevent contact with contents of the tank, the duct enclosing an interior space accessible only through a connection port extending though an opening in a tank sidewall;
   providing a heating element;
   positioning the heating element within the interior space through the connection port;
   operably connecting the heating element to a thermostatically controlled power supply; and
   operating the heating element within a specified temperature range to prevent liquid contained in the tank from freezing.

10. The method of claim 9, further including the steps of:
    accessing the heating element through the connection port;
    removing the heating element from the interior space; and
    positioning a replacement heating element in the interior space.

11. The method of claim 9, further including the step of: accessing the heating element through the connection port.

12. The method of claim 9, wherein the duct is located so as to be below a minimum brine level in the tank.

13. The method of claim 9, wherein the duct is generally horizontally arranged and extends peripherally around an interior side wall of the tank.

14. The method of claim 9, wherein the tank and duct are both comprised of a thermoplastic material having a melting point greater than 150° F.

15. The method of claim 14, wherein the thermoplastic material is polyethylene.

\* \* \* \* \*